UNITED STATES PATENT OFFICE.

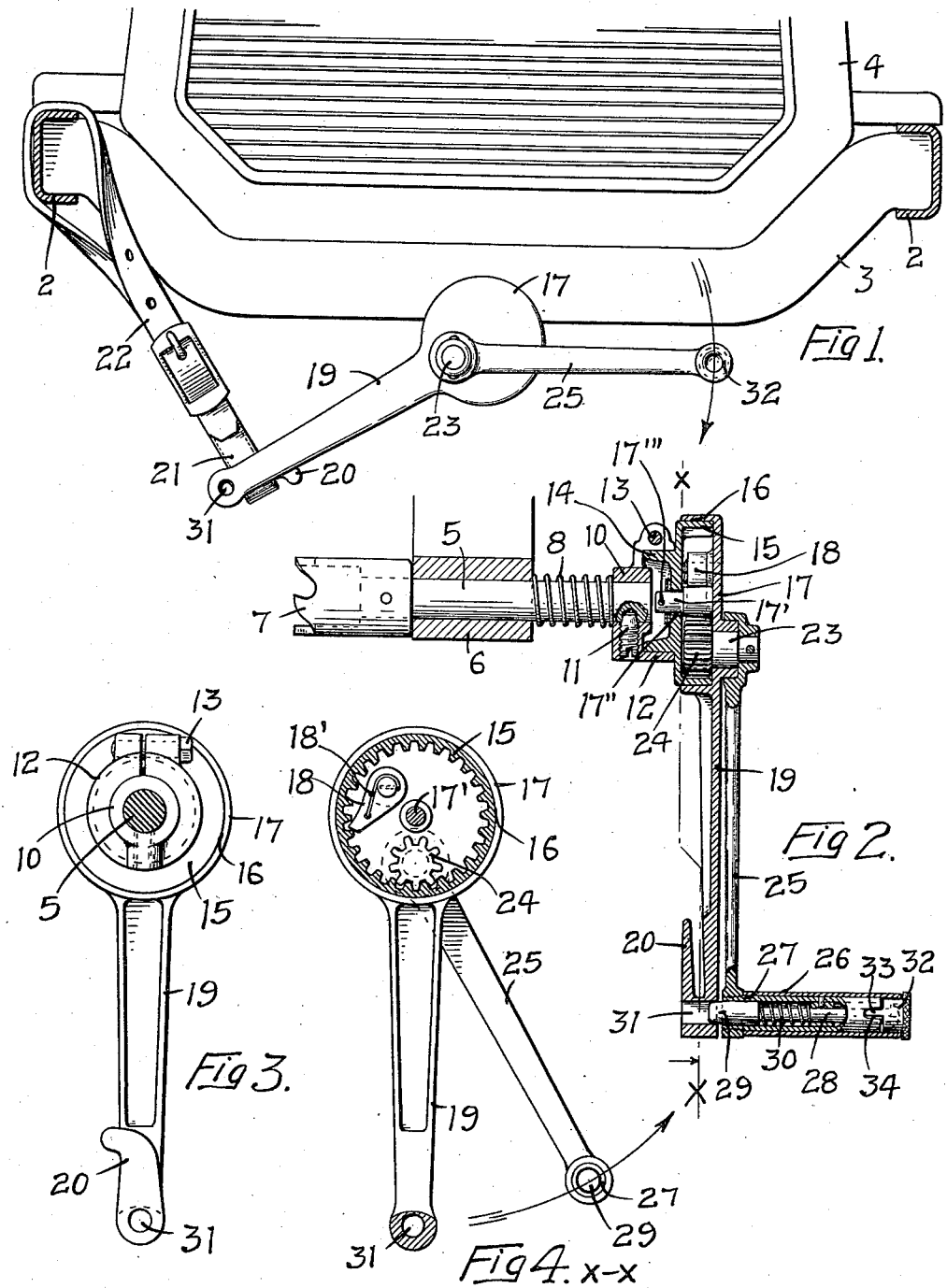

AXEL M. WALSTROM, OF MINNEAPOLIS, MINNESOTA.

STARTING-CRANK FOR HYDROCARBON-ENGINES.

1,034,543.  Specification of Letters Patent.  Patented Aug. 6, 1912.

Application filed August 31, 1911.  Serial No. 647,110.

*To all whom it may concern:*

Be it known that I, AXEL M. WALSTROM, of Minneapolis, Hennepin county, Minnesota, have invented certain new and useful Improvements in Starting-Cranks for Hydrocarbon-Engines, of which the following is a specification.

My invention is particularly designed to be used in conjunction with the combined compression release and priming device on which U. S. Letters Patent No. 981337 was issued to me on Jan. 10, 1911. Said device being adapted to form an explosive mixture on a comparatively slow movement of the pistons and incidentally releasing the compression in the cylinders, which, taken in conjunction with the increased leverage obtained by the use of my present invention, facilitates the cranking to an extent that makes it possible for a child to start a large engine.

The object of my invention is to provide a starting crank for hydrocarbon engines by means of which the operator may, either, connect said crank directly to the engine shaft when it is found necessary to turn the engine over rapidly, as in starting on the magneto in cold weather, or, connect said crank to the engine shaft through reducing gears whereby the revolution of the crank to the engine shaft is multiplied and thereby turning the engine shaft more slowly but with less effort, yet starting the engine under favorable circumstances, as, for example, in starting on the batteries in warm weather and with a high grade of gasolene, or when used in conjunction with the above mentioned priming device.

A further object is to provide a starting crank by means of which a strong person may start the engine in the customary way, but, being also adapted to be used with ease and perfect safety by a youth, woman or other person having less strength and courage.

The invention consists generally in the constructions and features hereinafter described and particularly pointed out in the claims.

In the accompanying drawing forming part of this specification, Figure 1 is a front view of a portion of an automobile with my invention applied thereto, Fig. 2 is a sectional view of my invention, and Fig. 3 is a rear view thereof. Fig. 4 is a sectional view on the line X—X of Fig. 2.

In the drawing, 2—2 represents the longitudinal frame members of an automobile connected by a transverse frame member 3 upon which the radiator 4 is mounted. The starting crank shaft 5 is slidably mounted in a bearing 6 beneath the member 3 and provided on one end with a jaw clutch member 7 adapted to engage a corresponding member on the engine crank shaft (not shown) and normally held out of contact therewith by a spring 8.

The parts above described are common to nearly all automobiles and to facilitate the attachment of my invention thereto I merely remove the crank secured to the outer end of the shaft 5 and substitute the parts hereinafter described.

A collar 10 is secured to the outer end of the shaft 5 by a set screw 11, and is provided with a friction band 12 adapted to be contracted by a screw 13 to grip the friction surface of a flange 14 with sufficient tension to hold under normal conditions, but, adapted to slip under excessive strain, as in the case of a premature explosion causing a sudden reverse movement of the engine shaft. The flange 14 is integral with an internally toothed gear 15, which has a bearing 16 in a casing 17 and free to revolve therein in one direction, but prevented from revolving in the opposite direction by a pawl 18 mounted in said casing and yieldingly held in engagement with the teeth of said gear by a spring 18'.

The casing 17 has stud 17' projecting through a central opening 17'' in the gear 15 and provided with a cotter pin 17''' which prevents separation of the parts. The casing 17 is also provided with a projecting crank arm 19, which I will hereinafter term a "primary crank." This primary crank is provided at its outer end with an integral hook 20 adapted to be inserted into the looped end 21 of a strap 22, which is secured to a frame member 2 or other suitable part of the automobile. Thus, the casing 17 is prevented from revolving in one direction. The said casing 17 is provided with a bearing for a stud 23, which is provided on its inner end with a pinion 24 meshing with the gear 15, and on its outer end with a crank arm 25, which I will designate a "secondary crank." This secondary crank is provided with a hand grip 26 free to revolve on a hollow stud 27.

Any suitable means for detachably connecting the primary and secondary cranks may be employed, but I prefer the mechanism shown in the drawing and consisting of a bolt 28 slidably arranged within the stud 27 and having one end 29 adapted to be projected by a spring 30 into a hole 31 in the primary crank and thereby interlocking said cranks. The other end of the bolt 28 is provided with a head 32 having an inwardly extending projection 33 adapted to enter a recess 34 in the outer end of the stud 27 when the bolt is in its projected or locking position, or, to rest upon the end of said stud when in its retracted or unlocked position.

In operation, the operator, wishing to start the engine with the primary crank, will disengage the looped end of the strap 22 from the hook 20, move the clutch member 7 into engagement with the engine shaft and proceed in the customary way. If, however, the operator wishes to use less effort and risk by using the secondary crank the bolt 28 is withdrawn and said secondary crank used in the same manner as the primary crank and thereby revolving the pinion 24, which, in turn, will revolve the gear 15, the collar 10, shaft 5 and the engine shaft. Should the movement of the shaft be suddenly reversed through a premature ignition of the charge in the cylinders, there will be no danger of injury to the operator if the secondary crank is used, as the pawl 18 will prevent reverse movement of the parts.

My invention is also adapted for use in connection with stationary, marine and motor truck engines and may be modified in various ways without departing from its general principle.

I claim as my invention,

1. A starting crank for hydrocarbon engines, comprising, a starting crank shaft having means for connection with the engine shaft, an internally toothed gear having frictional connection with said starting crank shaft, a casing inclosing said gear, means carried by said casing for preventing reverse movement of said gear, a pinion meshing with said gear and carried by a stud having a bearing in said casing, an operating handle secured to said stud, detachable means for preventing revolution of said casing, and means for interlocking said casing and said operating handle.

2. A starting crank for hydrocarbon engines, comprising, a starting crank shaft having means at one end for connection with the engine crank shaft and provided at its other end with one member of a friction clutch, an internally toothed gear carried by the other member of said friction clutch, a casing inclosing said gear, means provided in said casing for preventing reverse movement of said gear, a pinion meshing with said gear and carried by an operating crank having a bearing in said casing, detachable means for preventing revolution of said casing, and means for interlocking said casing and said operating crank so that they may be revolved together.

3. A starting crank for hydrocarbon engines, comprising, an auxiliary shaft having means at one end adapted to engage the engine shaft, a casing provided at the other end of said auxiliary shaft, intermeshing gears provided in said casing, one of said gears being yieldingly connected with said auxiliary shaft, an operating crank connected with another of said gears, the relative sizes of said gears being such that it will require several revolutions of said operating crank to revolve said auxiliary shaft once, means within said casing for preventing reverse movement of said gears and said operating crank, detachable means for preventing revolution of said casing when said operating crank is being used, and means for interlocking said casing and said operating crank so as to cause said operating crank said casing and said auxiliary shaft to revolve together at the same speed.

4. A starting device for hydrocarbon engines, comprising, an auxiliary shaft having means at one end adapted to be connected with the engine shaft and a casing at the other end provided with a crank arm, detachable means engaging said crank arm and preventing revolution of said casing, an operating crank having a bearing in said casing and yieldingly connected to said auxiliary shaft through suitable gearing within said casing whereby said auxiliary shaft is revolved at a slower speed than that of said operating crank, means for preventing reverse movement of said operating crank, and means whereby said crank arm and said operating crank may be connected and revolved together and causing said auxiliary shaft to be revolved at the same speed as said operating crank.

5. A starting device for hydrocarbon engines, comprising an auxiliary shaft adapted to be moved into or out of engagement with the engine shaft, a crank arm mounted on the outer end of said auxiliary shaft, detachable means for preventing rotation of said crank arm, a suitable friction clutch interposed between said auxiliary shaft and said crank arm, an operating crank provided near said crank arm, suitable speed reducing gearing connecting said operating crank with one member of said friction clutch whereby said auxiliary shaft may be revolved at a slower speed than said operating crank, means for interlocking said crank arm and said operating crank so that said auxiliary shaft said crank arm and said operating crank may be revolved together at the same speed.

In witness whereof, I have hereunto set my hand this 29th day of August 1911.

AXEL M. WALSTROM.

Witnesses:
M. R. McINNIS,
C. H. REHFUSS.